(12) United States Patent
Tsuruda et al.

(10) Patent No.: US 11,632,901 B2
(45) Date of Patent: Apr. 25, 2023

(54) AUTONOMOUS TRAVEL WORK MACHINE

(71) Applicant: HONDA MOTOR CO., LTD., Tokyo (JP)

(72) Inventors: Kouki Tsuruda, Wako (JP); Shuhei Maruyama, Wako (JP); Masashi Takeichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 181 days.

(21) Appl. No.: 17/124,842

(22) Filed: Dec. 17, 2020

(65) Prior Publication Data

US 2021/0185906 A1 Jun. 24, 2021

(30) Foreign Application Priority Data

Dec. 24, 2019 (JP) .............................. JP2019-233322

(51) Int. Cl.
*A01D 34/00* (2006.01)
*G05D 1/02* (2020.01)

(52) U.S. Cl.
CPC ......... *A01D 34/008* (2013.01); *G05D 1/0238* (2013.01); *G05D 1/0246* (2013.01); *G05D 2201/0208* (2013.01)

(58) Field of Classification Search
CPC .. A01D 34/008; G05D 1/0238; G05D 1/0246; G05D 2201/0208
See application file for complete search history.

(56) References Cited

U.S. PATENT DOCUMENTS

| 11,203,120 B1 * | 12/2021 | Hill ........................ B25J 9/0087 |
| 2017/0020064 A1 * | 1/2017 | Doughty .............. G05D 1/0044 |
| 2019/0179326 A1 * | 6/2019 | Uemoto ............... G05D 1/0231 |

FOREIGN PATENT DOCUMENTS

WO 2017/109879 6/2017

\* cited by examiner

*Primary Examiner* — Hunter B Lonsberry
*Assistant Examiner* — Harrison Heflin
(74) *Attorney, Agent, or Firm* — Rankin, Hill & Clark LLP

(57) ABSTRACT

The autonomous travel work machine executes the predetermined operation on the operation target while autonomously traveling, and includes: a driving unit driving a wheel to cause a main body to travel; a reception opening disposed on a side face of the main body regarding a traveling direction of the main body; an operation unit mounted on the main body and executing the predetermined operation on the operation target; and a control unit that controls the driving unit switchably between a first operation of causing the main body to travel against the operation target and executing the predetermined operation by the operation unit on the operation target and a second operation of moving the main body to a position where the operation target can be received in the reception opening and executing the predetermined operation by the operation unit on the operation target received in the reception opening.

17 Claims, 6 Drawing Sheets

AUTONOMOUS TRAVEL WORK MACHINE

INCORPORATION BY REFERENCE

The present application claims priority under 35 U.S.C. § 119 to Japanese Patent Application No. 2019-233322 filed on Dec. 24, 2019. The content of the application is incorporated herein by reference in its entirety.

BACKGROUND OF THE INVENTION

Field of the Invention

The present invention relates to an autonomous travel work machine.

Description of the Related Art

A robot lawn mower is conventionally known as an example of an autonomous travel work machine. The robot lawn mower autonomously travels on the lawn ground or grassland and mows the lawn grass as an operation target. A robot lawn mower provided with a contact sensor that detects contact with an obstacle or the like is known (e.g., refer to International Publication No. WO 2017/109879). When the contact sensor detects contact with an obstacle, such a self-propelled lawn mower may change its traveling direction to avoid the obstacle and continue the operation of mowing the lawn grass.

However, when the self-propelled lawn mower having the conventional configuration comes into contact with lawn grass having a predetermined height or more, a predetermined hardness or more, and a predetermined thickness or more, the contact sensor may be activated to detect the lawn grass as an obstacle, and the self-propelled lawn mower may avoid the lawn grass. Accordingly, the lawn grass recognized as an obstacle may remain unmowed on the lawn ground.

It is an object of the present invention to provide an autonomous travel work machine capable of reliably executing a predetermined operation on an operation target.

SUMMARY OF THE INVENTION

An aspect of the prevent invention provides an autonomous travel work machine including a main body and a wheel, the autonomous travel work machine being configured to execute a predetermined operation on an operation target while autonomously traveling, the autonomous travel work machine including: a driving unit configured to drive the wheel to cause the main body to travel; a reception opening disposed on a side face of the main body with respect to a traveling direction of the main body; an operation unit mounted on the main body and configured to execute the predetermined operation on the operation target; and a control unit configured to control the driving unit switchably between a first operation of causing the main body to travel with respect to the operation target and executing the predetermined operation by the operation unit on the operation target and a second operation of moving the main body so that the operation target can be received in the reception opening and executing the predetermined operation by the operation unit on the operation target received in the reception opening.

According to an aspect of the present invention, the above autonomous travel work machine further includes a detection unit configured to detect the operation target, in which the control unit switches between the first operation and the second operation in accordance with a detection result of the detection unit.

According to an aspect of the present invention, in the above autonomous travel work machine, the control unit includes a contactless detection unit configured to contactlessly detect the operation target.

According to an aspect of the present invention, in the above autonomous travel work machine, the contactless detection unit includes an imaging unit.

According to an aspect of the present invention, in the above autonomous travel work machine, the detection unit includes a contact sensor configured to detect contact with the operation target.

According to an aspect of the present invention, in the above autonomous travel work machine, when the contact sensor is activated, and the contactless detection unit determines the operation target, the control unit causes the driving unit to execute the second operation.

According to an aspect of the present invention, in the above autonomous travel work machine, in the second operation, when the contactless detection unit detects the operation target, the control unit drives the driving unit and the operation unit to move the main body to a position where the reception opening faces the operation target and turn the main body toward the operation target to receive the operation target in the reception opening, and to cause the operation unit to execute the predetermined operation on the operation target.

According to an aspect of the present invention, in the above autonomous travel work machine, after the operation unit executes the predetermined operation, the control unit moves the main body backward and causes the driving unit to execute the second operation again when the contactless detection unit further detects the operation target.

According to an aspect of the present invention, in the above autonomous travel work machine, after the operation unit executes the second operation, the control unit causes the main body to repeat, a predetermined number of times, a third operation of turning the main body to a position where the reception opening faces the operation target, moving the main body by a predetermined distance with the reception opening facing the operation target, then turning the main body toward the operation target to receive the operation target in the reception opening, and executing the predetermined operation by the operation unit on the operation target.

According to an aspect of the present invention, in the above autonomous travel work machine, the main body includes a cover covering the operation unit, and the reception opening is a clearance between the cover and the wheel.

According to an aspect of the present invention, in the above autonomous travel work machine, the operation target is lawn grass.

According to the above aspects of the present invention, it is possible to reliably execute a predetermined operation on an operation target.

DETAILED DESCRIPTION OF THE PREFERRED EMBODIMENT

Hereinbelow, an embodiment of the present invention will be described with reference to the drawings.

Figure 1:
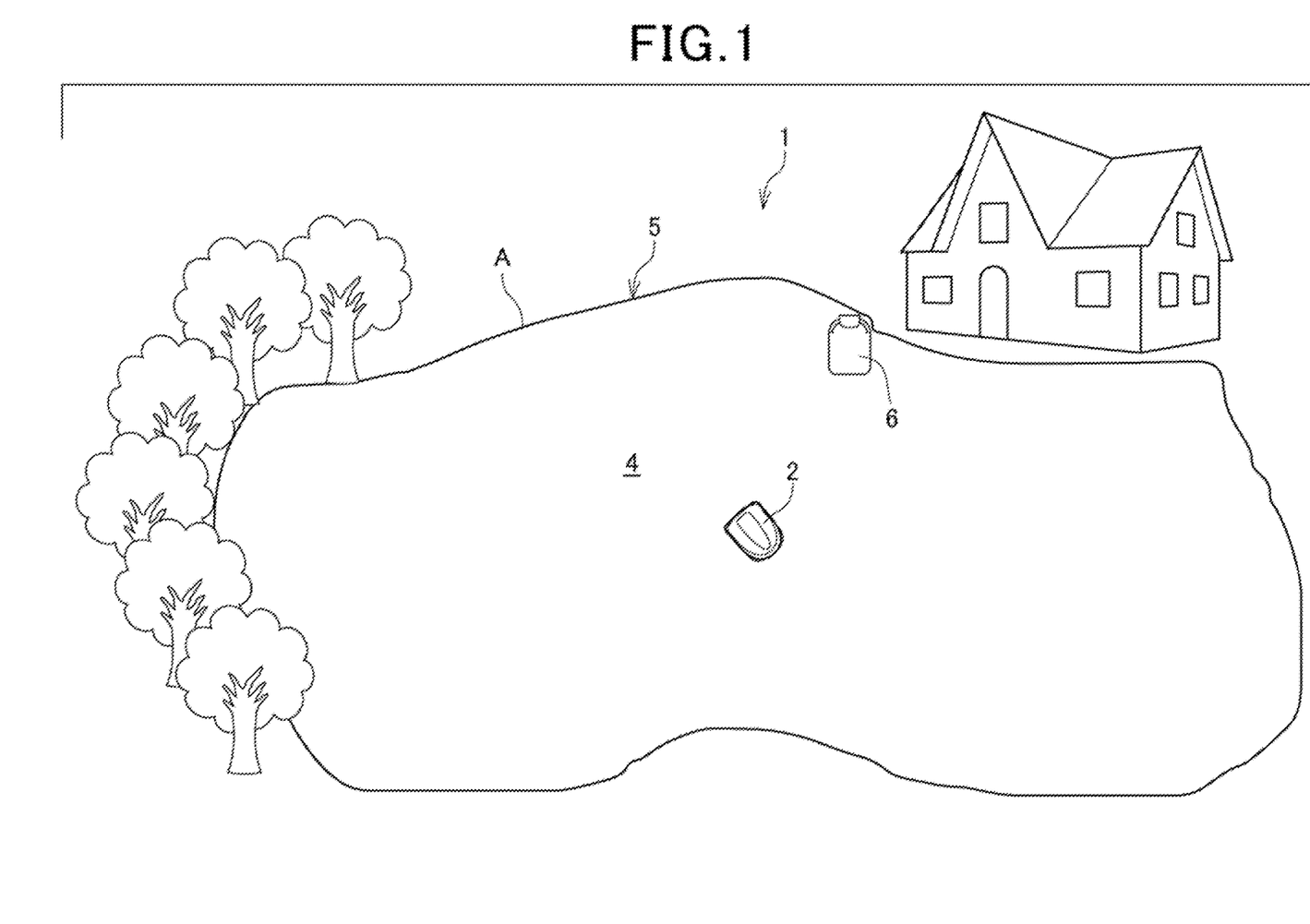
FIG. 1 is a diagram showing the configuration of an unattended lawn mowing system according to an embodiment of the present invention.

FIG. 1 is a diagram showing an example of the configuration of an unattended lawn mowing system 1 according to the present embodiment.

The unattended lawn mowing system 1 includes a robot lawn mower 2, an area wire 5 which defines a lawn mowing area 4 as a target area where a lawn mowing operation is executed, and a charging station 6. The lawn mowing area 4 of the present embodiment is the lawn ground in a park or a garden. Note that the lawn mowing area 4 is not limited thereto and may be the grassland in an orchard or a solar power plant. The lawn mower 2 may be applied to mowing of weeds on the field.

The robot lawn mower 2 is an autonomous travel work machine that mows lawn grass as an example of the "operation target" while autonomously traveling inside the lawn mowing area 4 without a person in attendance. The area wire 5 is a member that is laid along a boundary A of the lawn mowing area 4 by, for example, an operator to enable the robot lawn mower 2 to detect the boundary A. In the present embodiment, the laid area wire 5 transmits a predetermined signal, and the robot lawn mower 2 detects the signal from the area wire 5 to detect the boundary A of the lawn mowing area 4. The robot lawn mower 2 corresponds to an example of the "autonomous travel work machine." Hereinbelow, the robot lawn mower 2 is merely referred to as the lawn mower 2 for convenience of description.

The charging station 6 is a charging device that charges the lawn mower 2. The charging station 6 is installed inside the lawn mowing area 4. The charging station 6 is also a standby place of the lawn mower when the lawn mower 2 is not in operation. The lawn mower 2 returns to the charging station 6 by autonomous travel when the lawn mowing operation is finished and is appropriately charged in the charging station 6.

Although the present embodiment describes the unattended lawn mowing system 1 including one lawn mower 2, the present invention is not limited thereto. The unattended lawn mowing system 1 may include two or more lawn mowers 2. In this case, the unattended lawn mowing system 1 may include a plurality of charging stations 6.

Figure 2:
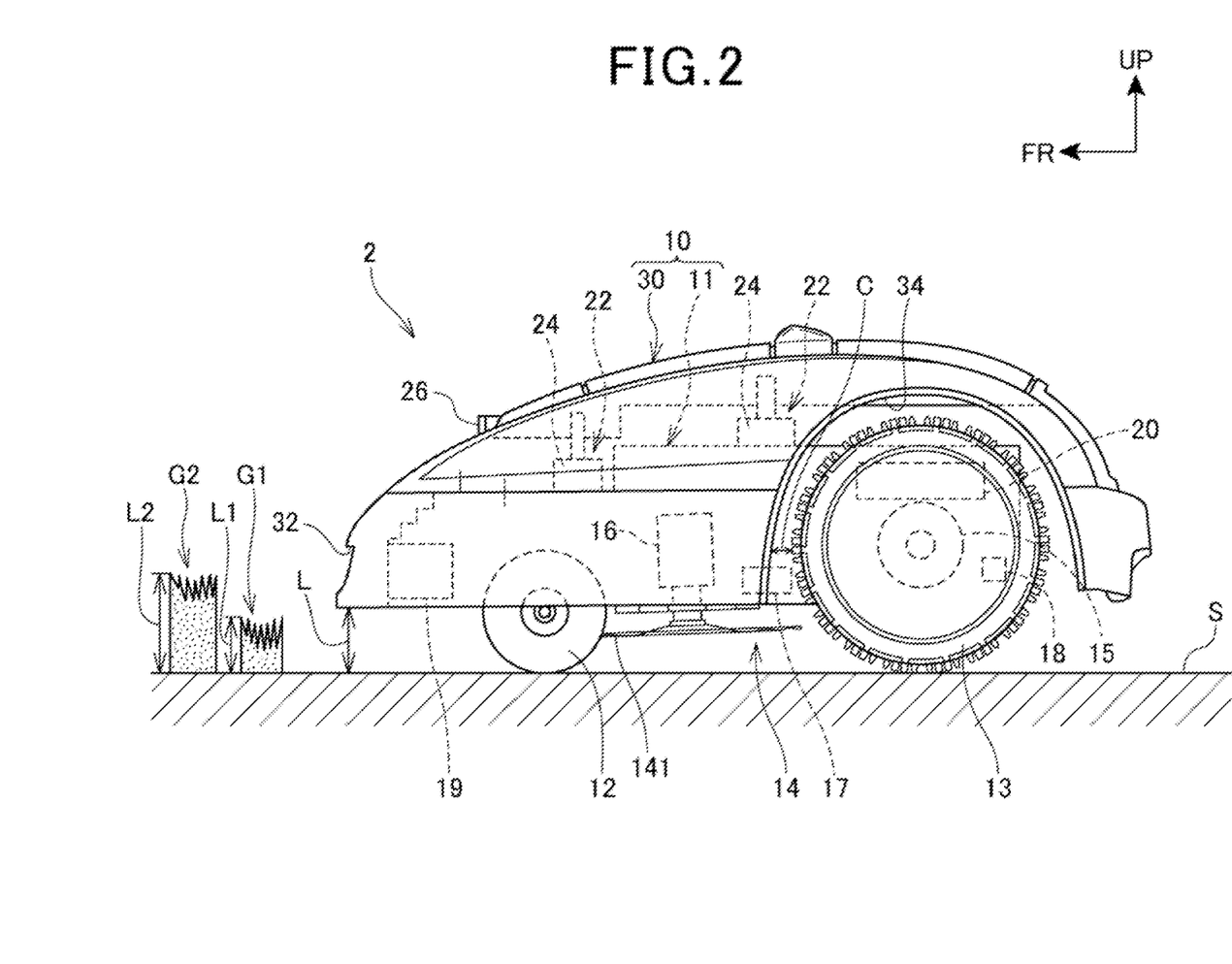
FIG. 2 is a side view showing the configuration of a lawn mower.

FIG. 2 is a side view showing an example of the configuration of the lawn mower 2.

The lawn mower 2 includes a main body 10 which includes a housing 11 and a cover 30 which covers the housing 11, front wheels 12 which are disposed on the right and left sides of a front part of the housing 11, rear wheels 13 which are disposed on the right and left sides of a rear part of the housing 11, and an operation unit 14 which is disposed under the center of the housing 11. The operation unit 14 includes a cutting blade disc 141. The cutting blade disc 141 includes a cutting blade that cuts the lawn grass. The lawn mower 2 includes a terminal unit 19 which is disposed in a front part of the lawn mower 2 and electrically connectable to the charging station 6.

The lawn mower 2 includes right and left traveling motors 15 which function as the "driving unit," an operation unit driving motor 16, a battery 17, a wheel speed sensor 18, and a control unit 20 which controls each part of the lawn mower 2, all of which are housed in the housing 11.

The right and left traveling motors 15 individually drive the right and left rear wheels 13, respectively. The lawn mower 2 travels by the traveling motors 15 driving the rear wheels 13 in accordance with an instruction from the control unit 20.

The operation unit driving motor 16 rotationally drives the cutting blade disc 141 of the operation unit 14. The lawn mowing operation is executed by the operation unit driving motor 16 rotationally driving the cutting blade disc 141 of the operation unit 14 in accordance with an instruction from the control unit 20.

The battery 17 supplies operation power to each part of the lawn mower 2. The wheel speed sensor 18 detects the rotation speed of the right and left rear wheels 13 as driving wheels. A detection signal of the wheel speed sensor 18 is transmitted to the control unit 20.

As described above, the lawn mower 2 includes the cover 30 which covers the housing 11. The cover 30 covers a front face, a rear face, each side face, and an upper face of the housing 11 and includes an open lower end. Thus, a lower face of the housing 11 and the cutting blade disc 141 are exposed from the lower end of the cover 30.

The cover 30 of the present embodiment is made of a resin material and functions as, for example, a protection cover that protects the housing 11 from rainwater, dust, and the like and a decorative cover that improves the appearance. The cover 30 may be made of not the resin material, but another material.

A plurality of holding devices 22 is attached to the upper face of the housing 11. The cover 30 is held by the holding devices 22 displaceably in the horizontal direction and the up-down direction with respect to the housing 11. In the present embodiment, three holding devices 22 in total are provided. One of the holding devices 22 is attached to the front side of the housing 11, and two of the holding devices 22 are attached to the rear side thereof.

The lower end of the cover 30 is disposed with a predetermined distance L from a traveling surface S on which the lawn mower 2 travels.

Each of the holding devices 22 includes a displacement sensor 24. The displacement sensor 24 detects a displacement of the holding device 22 and is capable of detecting a displacement between the housing 11 and the cover 30 through the holding device 22.

The cover 30 includes a feeding opening 32 at a position corresponding to the terminal unit 19. The feeding opening 32 allows the terminal unit 19 and outside of the cover 30 to communicate with each other. The lawn mower 2 is charged by connecting the terminal unit 19 to the charging station 6 through the feeding opening 32.

Fenders 34 are attached to the respective side faces of the cover 30. Each of the fenders 34 is formed in an arch shape along the upper side of an outer peripheral edge of the corresponding rear wheel 13 in side view of the housing 11. Thus, a side face of each of the rear wheels 13 is exposed from the cover 30. In the present embodiment, a clearance C which has a predetermined width and functions as the "reception opening" is disposed between the fender 34 and the rear wheel 13 in side view of the housing 11.

The lawn mower 2 includes a camera 26 which is capable of capturing an image of the outside of the lawn mower 2.

The camera 26 functions as the "imaging unit" which is included in the "contactless detection unit."

The camera 26 includes, for example, an image sensor, such as a CCD or a CMOS, and an imaging lens which forms an image of a subject on an imaging surface of the image sensor, and is capable of generating an image in digital format.

In the present embodiment, the camera 26 is attached to the front side of the upper face of the cover 30 and disposed with the imaging lens facing the traveling direction of the lawn mower 2. Thus, the camera 26 is capable of capturing an image of the front side in the traveling direction of the lawn mower 2. The camera 26 may be turnable in the horizontal direction or the up-down direction. The camera 26 may be an infrared camera.

Figure 3:
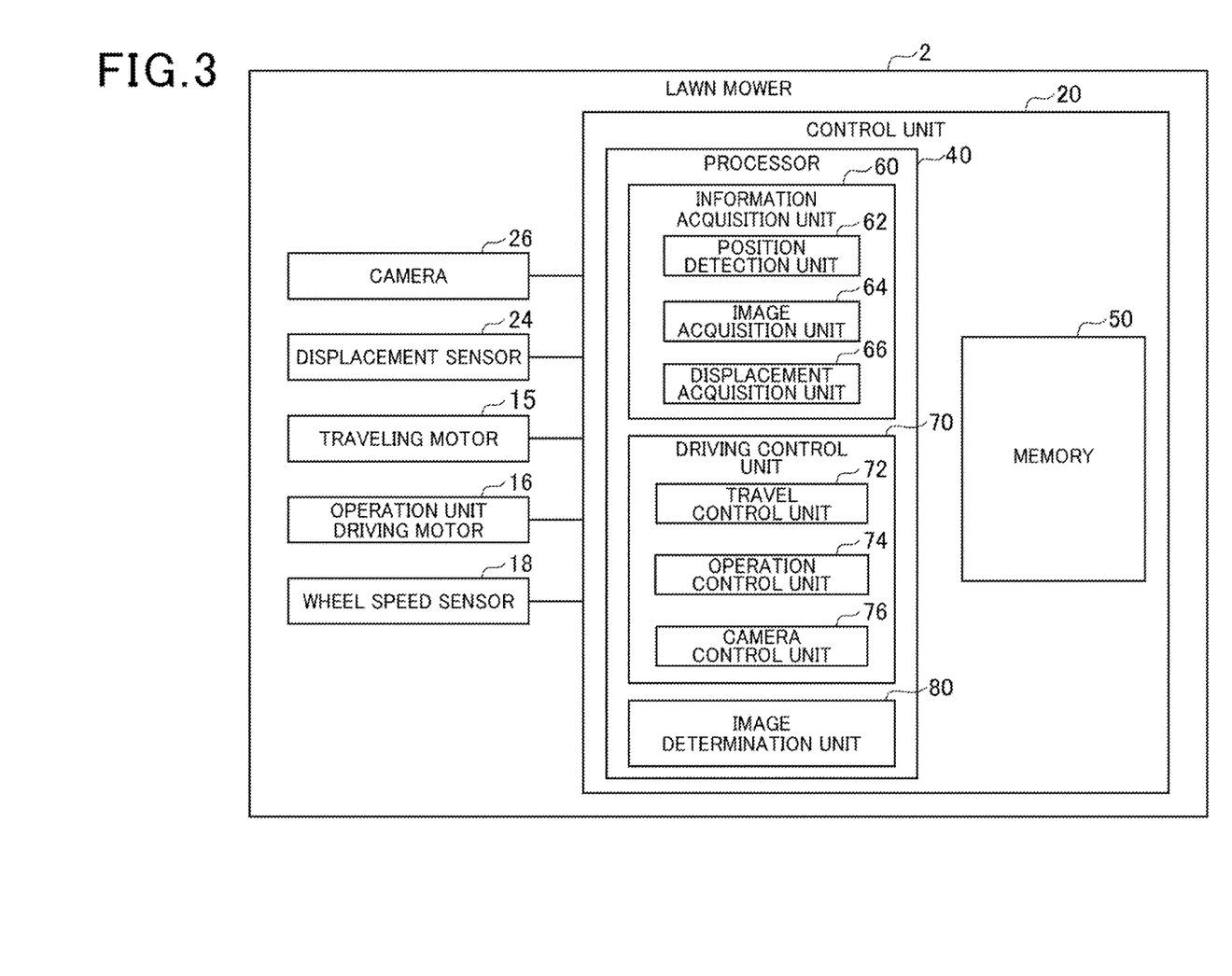
FIG. 3 is a block diagram showing the configuration of a principal part of the lawn mower.

FIG. 3 is a block diagram showing the configuration of a principal part of the lawn mower 2.

The control unit 20 is, for example, an electronic circuit unit including a processor 40, such as a CPU or an MPU, and a memory 50, such as a RAM or a ROM.

The control unit 20 functions as various control means including autonomous travel control which controls the traveling motors 15 for autonomous travel and lawn mowing operation control which controls the operation unit driving motor 16 for the lawn mowing operation by the processor 40 executing programs stored in the memory 50.

Various data items required for the autonomous travel control and the lawn mowing operation control, and programs are stored in the memory 50. The various data items include map data related to the lawn mowing area 4, schedule data indicating an automatic execution schedule of the lawn mowing operation, and data for discriminating lawn grass from objects other than the lawn grass.

The processor 40 includes an information acquisition unit 60 which receives a detection result transmitted from each part of the lawn mower 2, a driving control unit 70 which performs operation control for each part of the lawn mower, an image determination unit 80 which performs determination on an image acquired by the image acquisition unit 64.

The information acquisition unit 60 includes a position detection unit 62, a displacement acquisition unit 66, and the image acquisition unit 64.

The position detection unit 62 detects a position of the lawn mower 2 on the basis of a signal acquired from the area wire 5 and a signal acquired from the wheel speed sensor 18.

The displacement acquisition unit 66 acquires a signal from the displacement sensor 24. The image acquisition unit 64 acquires an image captured by the camera 26.

The driving control unit 70 includes a travel control unit 72, an operation control unit 74, and a camera control unit 76.

The travel control unit 72 controls driving of the traveling motors 15 to control travel of the lawn mower 2.

The operation control unit 74 controls driving of the operation unit driving motor 16 to control rotation of the cutting blade disc 141 of the operation unit 14.

The camera control unit 76 controls imaging of the camera 26.

The image determination unit 80 determines a condition in front of the lawn mower 2 from an image acquired by the image acquisition unit 64. In the present embodiment, the image determination unit 80 mainly determines, from the image acquired by the image acquisition unit 64, whether an obstacle located in front of the lawn mower 2 is the lawn grass to be mowed. The image determination unit 80, the image acquisition unit 64, and the camera 26 function as the "contactless detection unit."

As described above, the memory 50 stores therein various data items and programs. For example, the memory 50 stores therein a condition for discriminating lawn grass from objects other than the lawn grass. In addition, the memory 50 also functions as a working memory that temporarily stores various pieces of information and data. For example, positional information of the lawn mower 2 and an obstacle that has made contact with the lawn mower 2 is temporarily stored in the memory 50.

The lawn mower 2 controlled by the control unit 20 mows lawn grass G1 having a height L1 shorter than the distance L to a predetermined height by rotating the cutting blade disc 141 while traveling. Hereinbelow, this operation is referred to as a first operation for convenience of description.

The lawn mower 2 repeats the first operation in the lawn mowing area 4 to mow the lawn grass in the entire lawn mowing area 4 to the predetermined height.

Various objects such as a rock, a projection, a sprinkler, and a solar panel may be disposed inside the lawn mowing area 4. The lawn mower 2 traveling in the lawn mowing area 4 may come into contact with these objects or an obstacle such as a pedestrian moving inside the lawn mowing area 4.

At this time, a part of the cover 30, the part being located on the front side in the traveling direction of the lawn mower 2, mainly comes into contact with these obstacles. When the lawn mower 2 makes contact with an obstacle or a foreign matter, a displacement occurs between the housing 11 and the cover 30. The displacement sensor 24 detects the displacement, and the displacement acquisition unit 66 acquires a signal from the displacement sensor 24, so that the control unit 20 detects a collision between the lawn mower 2 and the obstacle.

That is, the displacement sensor 24 functions as the contact sensor of the lawn mower 2 and generates a signal indicating that an obstacle is present on a path of the lawn mower 2.

Since the lawn grass G1 having the height L1 shorter than the distance L does not come into contact with the cover 30, the lawn grass G1 is not detected as an obstacle.

In a conventional lawn mower, to smoothly mow the lawn, when the control unit 20 detects a collision, the lawn mower changes its direction immediately or after traveling backward once and performs the first operation again in a direction different from the direction in which the collision has been detected.

However, lawn grass G2 having a height L2 longer than the distance L may be present in the lawn mowing area 4. The lawn grass G2 can come into contact with the cover 30. In particular, when the lawn grass G2 grows thickly, or when the lawn grass G2 is thick and hard, the lawn mower 2 that has made contact with the lawn grass G2 cannot push the lawn grass G2 down using the cover 30. Thus, the displacement sensor 24 may be activated and detect the lawn grass G2 as an obstacle, which may disable the lawn mower 2 from mowing the lawn grass G2.

Thus, the conventional lawn mower may travel while avoiding the lawn grass G2, and the lawn grass G2 may remain unmowed in the lawn mowing area 4.

In the present embodiment, to prevent the lawn grass G2 from remaining unmowed, when the control unit 20 detects a collision between the lawn mower 2 and an obstacle, the lawn mower 2 performs a second operation which is a predetermined operation switched from the first operation.

FIGS. 4A to 4D are diagrams showing operation of the lawn mower 2.

Figure 4A:
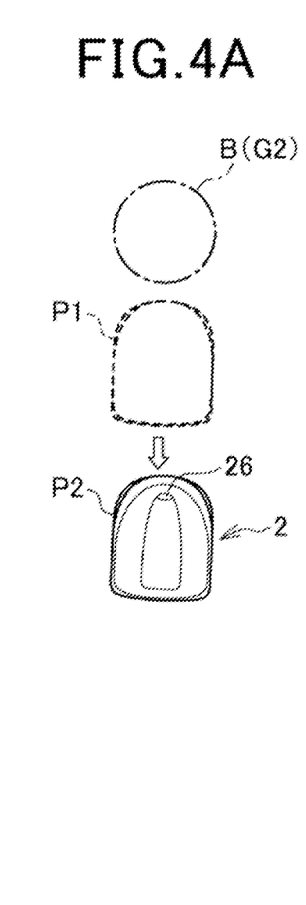
FIGS. 4A to 4D are diagrams showing operation of the lawn mower.

When the control unit 20 detects a collision between the lawn mower 2 and an obstacle B, the lawn mower 2 moves backward from a position P1 where the collision is detected to a position P2 where the lawn mower 2 is separated by a predetermined distance from the obstacle B as shown in FIG. 4A. At the position P2, the camera control unit 76 activates the camera 26 to cause the camera 26 to capture an image of the obstacle B. The captured image is acquired by the image acquisition unit 64, and the image determination unit 80 then determines whether the obstacle B ahead is the lawn grass G2.

When the image determination unit 80 determines that the obstacle B is not the lawn grass G2, that is, the obstacle B is an obstacle other than the lawn grass G2, the control unit 20 changes the direction of the lawn mower 2 at the position P2, and the lawn mower 2 then performs the first operation again in the direction for avoiding the obstacle B as with the conventional lawn mower.

Figure 4B:
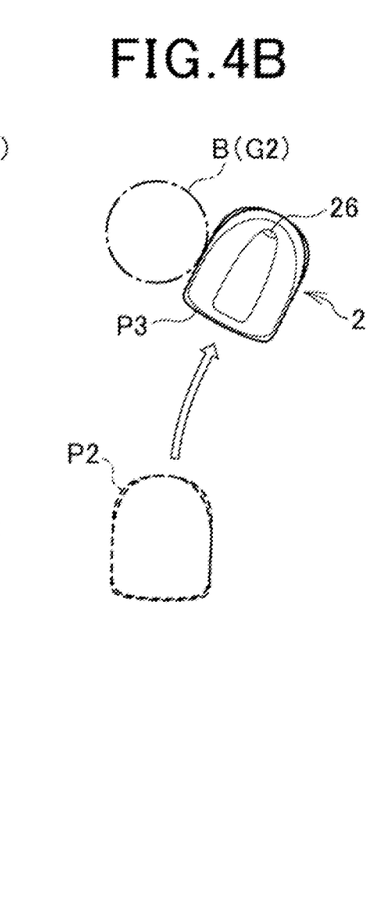

When the image determination unit 80 determines that the obstacle B is the lawn grass G2, the control unit 20 causes the lawn mower 2 to execute the second operation. Specifically, first, as shown in FIG. 4B, the lawn mower 2 is moved to a position P3 on the lateral side of the lawn grass G2 (obstacle B) when viewed from the position P2. At the position P3, the lawn mower 2 is placed with one of the side faces thereof facing the lawn grass G2.

Figure 4C:
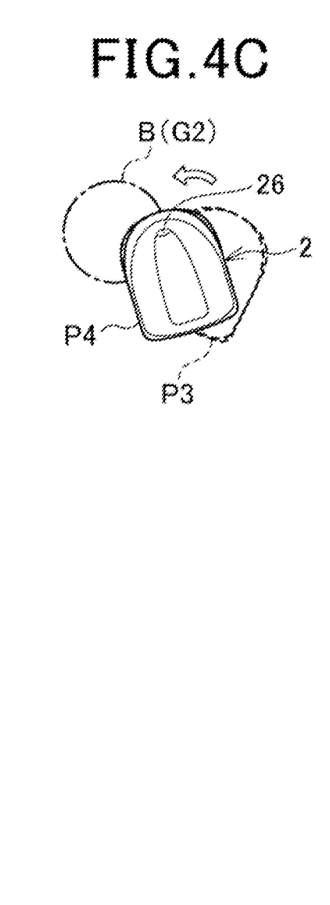

Next, as shown in FIG. 4C, the travel control unit 72 rotates the traveling motors 15 in different directions to turn the lawn mower 2 at the position P3 so that the side face facing the lawn grass G2 moves toward the lawn grass G2. In the present embodiment, the lawn mower 2 turns until the lawn mower 2 is placed at a position P4 where the lawn grass G2 is received inside the cover 30 through the clearance C.

As shown in FIG. 2, the cover 30 of the lawn mower 2 includes the clearance C on the side face thereof. The clearance C is continuous from the lower end of the cover 30 up to the upper end of the rear wheel 13. Thus, the clearance C is capable of receiving the lawn grass G2 having the height L2 longer than the distance L. As described above, the lawn grass G2 is received in the clearance C by the lawn mower 2 turning toward the obstacle B. The lawn grass G2 does not come into contact with the cover 30 by being received in the clearance C during the turn of the lawn mower 2. Thus, the lawn grass G2 is received inside the cover 30 without activating the displacement sensor 24.

The lawn grass G2 received in the clearance C is received inside the cover 30 while the lawn mower 2 turns from the position P3 to the position P4 and cut by the cutting blade disc 141 which is disposed inside the cover 30. The above operation is the second operation of the lawn mower 2.

The second operation makes it possible to receive the lawn grass G2 inside the cover 30 through the clearance C without activating the displacement sensor 24, which enables the lawn mower 2 to mow the lawn grass G2 having the height L2 longer than the distance L.

Figure 4D:
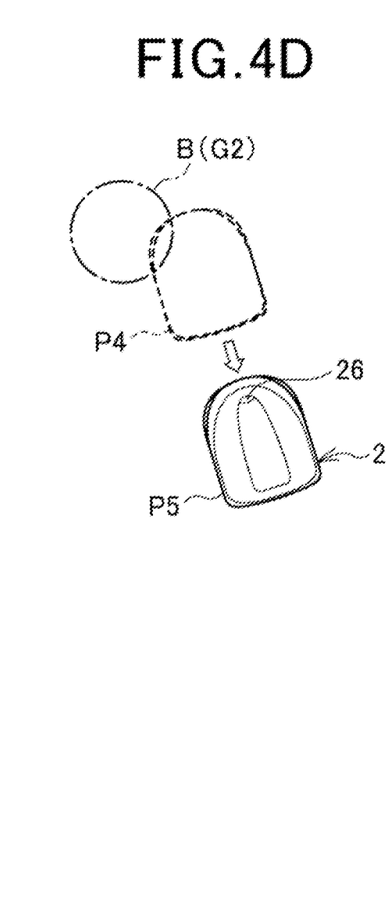

The lawn mower 2 stops turning after turning to the position P4 and moves backward to a position P5 which is separated by a predetermined distance from the obstacle B. At the position P5, the camera control unit 76 activates the camera 26 again to cause the camera 26 to capture an image in front of the lawn mower 2. The captured image is acquired by the image acquisition unit 64, and the image determination unit 80 then determines whether the lawn grass G2 is present in front of the lawn mower 2.

When the image determination unit 80 determines that the lawn grass G2 is not present in front of the lawn mower 2, the lawn mower 2 finishes the second operation and performs the first operation. When the image determination unit 80 determines that the lawn grass G2 is present in front of the lawn mower 2, the lawn mower 2 performs the second operation again.

In this manner, after the second operation, the lawn mower 2 moves backward up to the position P5, and the control unit 20 determines again whether the lawn grass G2 is present in front of the lawn mower 2. This enables the lawn mower 2 to reliably mow the lawn grass G2, thereby preventing the lawn grass G2 from remaining unmowed.

Figure 5:
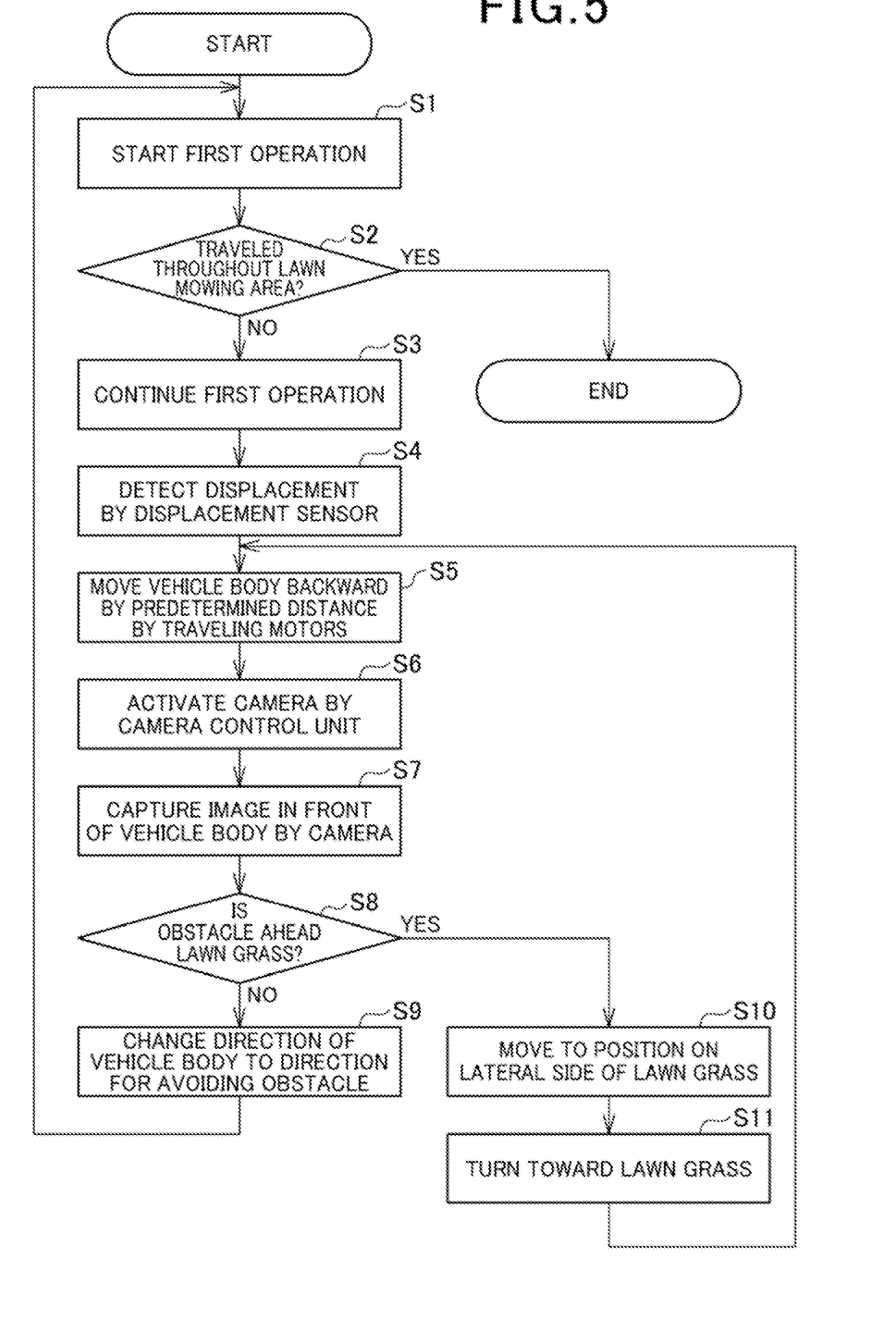
FIG. 5 is a flowchart showing a second operation of the lawn mower.

FIG. 5 is a flowchart showing operation of the lawn mower 2.

As shown in FIG. 5, the lawn mower 2 drives the operation unit 14 while traveling in the lawn mowing area 4 by, for example, an operation by an operator or control by the control unit 20 based on a schedule recorded in the memory 50 to start the first operation of mowing the lawn grass G1 to the predetermined height (step S1). At this time, the control unit 20 compares map data stored in the memory 50 with a travel record and a detection result of the position detection unit 62 to determine whether the lawn mower 2 has traveled throughout the inside of the lawn mowing area 4 where the lawn mower 2 can travel while controlling the operation of each part of the lawn mower 2 (step S2).

When the control unit 20 determines that the lawn mower 2 has traveled throughout the lawn mowing area 4 (step S2: YES), the lawn mower 2 finishes the first operation and returns to the charging station 6.

When the control unit 20 determines that the lawn mower 2 has not traveled throughout the lawn mowing area 4 (step S2: NO), the lawn mower 2 continues the first operation (step S3).

When the displacement sensor 24 of the lawn mower 2 detects a displacement (step S4), the displacement acquisition unit 66 acquires a signal from the displacement sensor 24, and the control unit 20 detects a collision with the obstacle B and determines that the obstacle B is present in front of the lawn mower 2.

Then, the travel control unit 72 reversely rotates each of the traveling motors 15 to move the lawn mower 2 backward to the position P2 (step S5).

At the position P2, the camera control unit 76 activates the camera 26 (step S6) to cause the camera 26 to capture an image in front of a vehicle body (step S7).

The captured image is acquired by the image acquisition unit 64, and the image determination unit 80 then determines whether the lawn grass G2 is included in the image. Accordingly, the control unit 20 determines whether the lawn grass G2 is present in front of the lawn mower 2 (step S8).

When it is determined that the lawn grass G2 is not included in the image, that is, the obstacle B is an obstacle other than the lawn grass (step S8: NO), the travel control unit 72 drives the traveling motors 15 to change the direction of the lawn mower 2 to the direction for avoiding the obstacle B ahead (step S9). Then, the control unit 20 causes the lawn mower 2 to start the first operation again (step S1). This enables the lawn mower 2 to continue the first operation while avoiding the obstacle B even when the lawn mower 2 has made contacted with the obstacle B.

On the other hand, when it is determined that the lawn grass G2 is included in the image, that is, the obstacle B is the lawn grass G2, and the lawn grass G2 is present in front of the lawn mower 2 (step S8: YES), the control unit 20 causes the lawn mower 2 to execute the second operation. More specifically, the travel control unit 72 drives the traveling motors 15 to move the lawn mower 2 to the position P3 on the lateral side of the lawn mower 2 (step S10).

Then, the travel control unit 72 rotates the traveling motors 15 in different directions to turn the lawn mower 2 from the position P3 to the position P4 (step S11). Along with the turn, the lawn mower 2 receives the lawn grass G2 inside the cover 30 through the clearance C. Inside the cover 30, simultaneously with the turn of the lawn mower 2, the cutting blade disc 141 is rotated by the operation unit driving motor 16, which is driven by the operation control unit 74, and the lawn grass G2 is cut by the cutting blade disc 141.

After the lawn mower 2 moves to the position P4, the control unit 20 finishes the second operation, and the travel control unit 72 reversely rotates each of the traveling motors 15 again to move the lawn mower 2 backward to the position P5 (step S5). Then, the camera control unit 76 activates the camera 26 (step S6) to cause the camera 26 to capture an image in front of the lawn mower 2 again (step S7).

The captured image is acquired by the image acquisition unit 64, and the image determination unit 80 then determines whether the lawn grass G2 is included in the image to determine whether the lawn grass G2 is present in front of the lawn mower 2 (step S8).

The control unit 20 repeats steps S5 to S11 until it is determined that the lawn grass G2 is not included in the image in step S8.

Then, when it is determined that the lawn grass G2 is not included in the image (step S8: NO), the control unit 20 starts the first operation again (step S1).

In this manner, when the control unit 20 detects a collision between the lawn mower 2 and the obstacle B, and the image determination unit 80 determines that the obstacle is the lawn grass G2 from the image captured by the camera 26, the lawn mower 2 repeatedly performs the second operation. This makes it possible to prevent the lawn grass G2 from remaining unmowed in the lawn mowing area 4.

As described above, in the present embodiment, the lawn mower 2 includes the pair of traveling motors 15 which causes the lawn mower 2 to travel, the clearance C disposed on the side face, the operation unit 14, and the control unit 20. The control unit 20 rotates the cutting blade disc 141 while causing the lawn mower 2 to travel to cause the lawn mower 2 to execute the first operation of mowing the lawn grass G1, which is located below the lower end of the cover 30, to the predetermined height. Moreover, the control unit 20 moves the lawn mower 2 to the position on the lateral side of the lawn grass G2 where the lawn grass G2 can be received in the clearance C and turns the lawn mower 2 to cause the lawn mower 2 to execute the second operation of receiving the lawn grass G2 inside the cover 30 through the clearance C and mowing the lawn grass G2. The control unit 20 is configured to control the pair of traveling motors 15 switchably between the first operation and the second operation.

This enables the lawn mower 2 to mow the lawn grass G2 having the height L2 higher than the lower end of the cover 30. Thus, it is possible to prevent the lawn grass from remaining unmowed in the lawn mowing area 4.

According to the present embodiment, the lawn mower 2 includes the image determination unit 60 which determines the lawn grass from the captured image, and the control unit 20 switches between the first operation and the second operation in accordance with the determination result of the image determination unit 80. This enables the lawn mower 2 to mow the lawn grass with a more appropriate operation according to the height of the lawn grass.

According to the present embodiment, the lawn mower 2 includes the image determination unit 80 which determines the lawn grass from the image captured by the camera 26, that is, contactlessly detects the lawn grass. This enables the control unit 20 to appropriately determine the lawn grass and obstacles other than the lawn grass.

According to the present embodiment, the lawn mower 2 includes the camera 26. This enables the image determination unit 80 to determine whether the obstacle is the lawn grass from the image captured by the camera 26.

According to the present embodiment, the lawn mower 2 includes the displacement sensor 24 which detects contact between the cover 30 and the obstacle. This enables the control unit 20 to detect contact between the lawn mower 2 and the obstacle or the lawn grass G2.

According to the present embodiment, the control unit 20 controls the traveling motors 15 to execute the second operation when the image determination unit 80 determines that the obstacle is the lawn grass G2 from the image captured when the displacement sensor 24 is activated. This enables the lawn mower 2 to execute the second operation on the lawn grass G2.

According to the present embodiment, when the image determination unit 80 detects the lawn grass G2, the control unit 20 controls each of the traveling motors 15 so that the lawn mower 2 can execute the second operation of moving the lawn mower 2 to the lateral side of the lawn grass G2 and the turning the lawn mower 2, and receiving the lawn grass G2 inside the cover 30 through the clearance C and mowing the lawn grass G2. This enables the lawn mower 2 to mow the lawn grass G2 without activating the displacement sensor 24.

According to the present embodiment, after the operation unit 14 mows the lawn grass G2, the control unit 20 moves the lawn mower 2 backward and causes the camera 26 to capture an image in front of the lawn mower 2. When the image determination unit 80 detects the lawn grass G2 from the captured image, the control unit 20 causes the lawn mower 2 to execute the second operation again. This enables the lawn mower 2 to mow the lawn grass G2 without activating the displacement sensor 24.

According to the present embodiment, the lawn mower 2 includes the cover 30 which covers the operation unit 14, the rear wheels 13 which are driven by the respective traveling motors 15, and the clearance C which is disposed between the cover 30 and the rear wheels 13. This enables the lawn grass G2 having the height L2 longer than the distance L to be received inside the cover 30 without activating the displacement sensor 24 and enables the lawn mower 2 to mow the lawn grass G2.

Next, a modification of the present invention will be described.

Figure 6A:
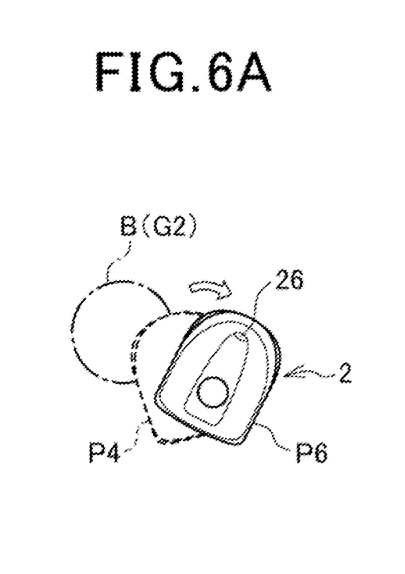
FIGS. 6A to 6C are diagrams showing operation of a lawn mower according to a modification of the present invention.
Figure 6B:
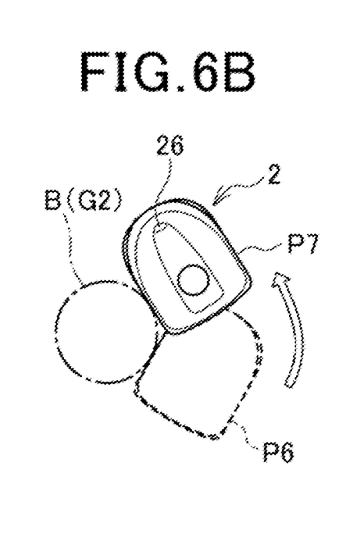
Figure 6C:
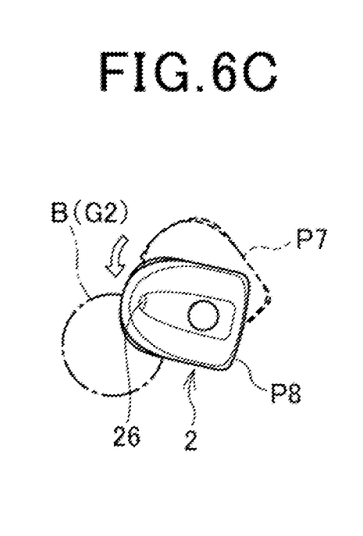

FIGS. 6A to 6C are diagrams showing operation of a lawn mower 2 according to the modification of the present invention.

In the above embodiment, after the second operation, the lawn mower 2 turns from the position P3 to the position P4 and then moves backward to the position P5. In the present modification, a third operation is repeated a predetermined number of times. In the third operation, the lawn mower 2 moves straight ahead while turning so that the side face of the lawn mower 2 moves toward the lawn grass G2 from the position P4.

Specifically, as shown in FIG. 6A, the lawn mower 2 stops turning after turning to the position P4 and turns in the direction away from the lawn grass G2 to move to a position P6. The position P6 is substantially the same as the position P3. At the position P6, the lawn mower 2 is placed with one of the side faces thereof facing the lawn grass G2.

Then, as shown in FIG. 6B, while maintaining a state in which one of the side faces of the lawn mower 2 faces the lawn grass G2, the control unit 20 moves the lawn mower 2 by a predetermined distance while turning the lawn mower 2 along the outer edge of the lawn grass G2 to place the lawn mower 2 at a position P7. At the position P7, the lawn mower 2 is placed with one of the side faces thereof facing the lawn grass G2.

Then, as shown in FIG. 6C, at the position P7, the control unit 20 turns the lawn mower 2 so that the side face facing the lawn grass G2 moves toward the lawn grass G2. The lawn mower 2 turns up to a position P8 where the lawn grass G2 is received inside the cover 30 through the clearance C and mows the lawn grass G2 received in the clearance C. The control unit 20 causes the lawn mower 2 to execute the third operation the predetermined number of times.

That is, when the image determination unit 80 determines that the obstacle B is the lawn grass G2, the lawn mower 2 of the present modification continuously performs the third operation the predetermined number of times without moving backward after executing the second operation.

In the third operation, the control unit 20 causes the camera 26 to capture images at predetermined intervals during the third operation and causes the image determination unit 30 to perform determination on the captured image every time the image is captured to detect the lawn grass G2. Further, the control unit 20 causes the lawn mower 2 to travel in accordance with the detection result.

The lawn mower 2 can mow the lawn grass G2 having the height L2 longer than the distance L without the lawn grass G2 remaining unmowed without activating the displacement sensor 24 by repeating the third operation the predetermined number of times.

In the above third operation, the lawn mower 2 may turn toward the operation target again after moving forward for a predetermined time and mow the lawn grass G2 as the operation target taken in through the clearance C.

For example, when the above operation is performed, the control unit 20 may determine the position of the lawn grass G2 on the basis of the image captured at the position P2 and cause the lawn mower 2 to travel in accordance with the determination.

In this case, when the lawn mower 2 moves to a position where the position of the lawn grass G2 cannot be obtained from the image captured at the position P2, the control unit 20 moves the lawn mower 2 backward to a position separated by a predetermined distance from the lawn grass G2. Then, the control unit 20 causes the camera 26 to capture an image of the lawn grass G2 again and causes the image determination unit. 80 to determine the position of the lawn grass G2 again.

The above embodiment describes, as an example, one aspect of the present invention, and any modifications and applications can be made without departing from the gist of the present invention.

For example, although, in the above embodiment, the clearance C between the rear wheel 13 and the fender 34 serves as the reception opening in which the lawn grass G2 is received, the present invention is not limited thereto. A slit extending in the height direction of the lawn mower 2 may be formed on the side face of the cover 30, and the slit may serve as the reception opening. Moreover, for example, the distance between at least a part of the lower end of the side face of the cover 30 and the traveling surface S may be longer than the height L2.

For example, in the above embodiment, the lawn mower 2 includes the displacement sensor 24 which is the contact sensor, and the camera 26 is activated to capture an image when the displacement sensor 24 generates a signal. However, the present invention is not limited thereto, and the lawn mower 2 may not include the contact sensor. In this case, the camera 26 is in operation all the time and captures an image or video every predetermined time or continuously during travel of the lawn mower 2. The lawn mower 2 may detect: an obstacle by determination of the image determination unit 80 on the image or video recorded by the camera 26, the determination being performed every time the image or video is captured.

For example, in the above embodiment, the lawn mower 2 includes the camera 26 as the "imaging unit" included in the "contactless detection unit." However, the present invention is not limited thereto, and the lawn mower 2 may include a LIDAR, an infrared sensor, a laser scanner, or an ultrasonic sensor as detection means included in the "contactless detection unit."

REFERENCE SIGNS LIST 1 unattended lawn mowing system
2 lawn mower, robot lawn mower (autonomous travel work machine)
10 main body
12 front wheel (wheel)
13 rear wheel (wheel)
14 operation unit
15 traveling motor (driving unit)
16 operation unit driving motor
20 control unit
24 displacement sensor (contact sensor, detection unit)
26 camera (imaging unit, detection unit, contactless detection unit)
60 information acquisition unit
62 position detection unit
64 image acquisition unit (detection unit, contactless detection unit)
66 displacement acquisition unit
70 driving control unit
72 travel control unit
74 operation control unit
80 image determination unit (detection unit, contactless detection unit)
G1, G2 lawn grass

What is claimed is:

1. An autonomous travel work machine comprising a main body and a wheel, the autonomous travel work machine being configured to execute a predetermined operation on an operation target while autonomously traveling, the autonomous travel work machine comprising:
   a driving unit that is a motor configured to drive the wheel to cause the main body to travel;
   a reception opening disposed on the main body;
   an operation unit that is a cutting blade mounted on the main body and configured to execute the predetermined operation on the operation target;
   a control unit that is a processor configured to control the driving unit switchably between a first operation of causing the main body to travel with respect to the operation target and executing the predetermined operation by the operation unit on the operation target and a second operation of moving the main body so that the operation target can be received in the reception opening and executing the predetermined operation by the operation unit on the operation target; and a detection unit configured to detect the operation target, wherein the control unit switches between the first operation and the second operation in accordance with a detection result of the detection unit, the detection unit includes a contactless detection unit configured to contactlessly detect the operation target, and a contact sensor configured to detect contact with the operation target, in the second operation, when the contactless detection unit detects the operation target, the control unit turns the main body so that the operation target is received in the reception opening, whereby executing the predetermined operation by the operation unit on the operation target.

2. The autonomous travel work machine according to claim 1, wherein the contactless detection unit includes an imaging unit.

3. The autonomous travel work machine according to claim 1, wherein, when the contact sensor is activated, and the contactless detection unit determines the operation target, the control unit causes the driving unit to execute the second operation.

4. The autonomous travel work machine according to claim 1, wherein the reception opening is disposed on a side face of the main body with respect to a traveling direction of the main body, in the second operation, when the contactless detection unit detects the operation target, the control unit drives the driving unit and the operation unit to move the main body to a position where the reception opening faces the operation target and turn the main body toward the operation target to receive the operation target in the reception opening, and to cause the operation unit to execute the predetermined operation on the operation target received in the reception opening.

5. The autonomous travel work machine according to claim 4, wherein, after the operation unit executes the predetermined operation, the control unit moves the main body backward and causes the driving unit to execute the second operation again when the contactless detection unit further detects the operation target.

6. The autonomous travel work machine according to claim 4, wherein, after the operation unit executes the second operation, the control unit causes the main body to repeat, a predetermined number of times, a third operation of turning the main body to a position where the reception opening faces the operation target, moving the main body by a predetermined distance with the reception opening facing the operation target, then turning the main body toward the operation target to receive the operation target in the reception opening, and executing the predetermined operation by the operation unit on the operation target.

7. The autonomous travel work machine according to claim 1, wherein the main body includes a cover covering the operation unit, and the reception opening is a clearance disposed between the cover and the wheel.

8. The autonomous travel work machine according to claim 1, wherein the operation target is lawn grass.

9. The autonomous travel work machine according to claim 1, wherein at least a portion of the operation unit overlaps with the reception opening when viewed from a side of the main body, the side extending in a traveling direction of the main body.

10. The autonomous travel work machine according to claim 9, wherein the main body includes a cover covering the operation unit, the reception opening is a clearance disposed between the cover and the wheel, the wheel comprises a front wheel and a rear wheel, and at a range between the front wheel and the rear wheel, a portion of the operation unit overlaps with the reception opening.

11. An autonomous travel work machine comprising a main body and a wheel, the autonomous travel work machine being configured to execute a predetermined operation on an operation target while autonomously traveling, the autonomous travel work machine comprising:

a driving unit that is a motor configured to drive the wheel to cause the main body to travel;

a reception opening disposed on a side face of the main body with respect to a traveling direction of the main body and continuously opening from a location facing a traveling surface on which the autonomous travel work machine travels to a position higher than a lowest end of the main body in a direction of gravity;

an operation unit that is a cutting blade mounted on the main body and configured to execute the predetermined operation on the operation target; and a control unit that is a processor configured to control the driving unit.

12. The autonomous travel work machine according to claim 11, wherein at least a portion of the operation unit overlaps with the reception opening when viewed from a side of the main body, the side extending in a traveling direction of the main body.

13. The autonomous travel work machine according to claim 12, wherein the main body includes a cover covering the operation unit, the reception opening is a clearance disposed between the cover and the wheel, the wheel comprises a front wheel and a rear wheel, and at a location between the front wheel and the rear wheel, a portion of the operation unit overlaps with the reception opening.

14. The autonomous travel work machine according to claim 11, wherein the reception opening continuously opens to a position higher than a lower face of a housing of the main body, the housing being covered with a cover.

15. An autonomous travel work machine comprising a main body and a wheel, the autonomous travel work machine being configured to execute a predetermined operation on an operation target while autonomously traveling, the autonomous travel work machine comprising:

a driving unit that is a motor configured to drive the wheel to cause the main body to travel;

a reception opening disposed on a side face of the main body with respect to a traveling direction of the main body;

an operation unit that is a cutting blade mounted on the main body and configured to execute the predetermined operation on the operation target; and a control unit that is a processor configured to control the driving unit, wherein the reception opening is a clearance disposed between the main body and the wheel, and in the traveling direction of the main body, the clearance at a lower part of the main body is larger than the clearance at an upper part of the main body.

16. The autonomous travel work machine according to claim 15, wherein at least a portion of the operation unit overlaps with the reception opening when viewed from a side of the main body, the side extending in a traveling direction of the main body.

17. The autonomous travel work machine according to claim 16, wherein the main body includes a cover covering the operation unit, the reception opening is a clearance disposed between the cover and the wheel, the wheel comprises a front wheel and a rear wheel, and at a location between the front wheel and the rear wheel, a portion of the operation unit overlaps with the reception opening.

\* \* \* \* \*